United States Patent
Weyna et al.

(10) Patent No.: US 9,160,523 B2
(45) Date of Patent: Oct. 13, 2015

(54) APPARATUS AND METHOD TO PREVENT SIDE CHANNEL POWER ATTACKS IN ADVANCED ENCRYPTION STANDARD

(71) Applicant: THE UNITED STATES OF AMERICA AS REPRESENTED BY THE SECRETARY OF THE AIR FORCE, Washington, DC (US)

(72) Inventors: Lisa Weyna, Manlius, NY (US); John W. Rooks, Rome, NY (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 113 days.

(21) Appl. No.: 14/151,944

(22) Filed: Jan. 10, 2014

(65) Prior Publication Data

US 2014/0321638 A1    Oct. 30, 2014

Related U.S. Application Data

(60) Provisional application No. 61/817,372, filed on Apr. 30, 2013.

(51) Int. Cl.
*H04L 9/06* (2006.01)
*H04L 9/00* (2006.01)
*G09C 1/00* (2006.01)

(52) U.S. Cl.
CPC .............. *H04L 9/0631* (2013.01); *G09C 1/00* (2013.01); *H04L 9/003* (2013.01); *H04L 2209/12* (2013.01)

(58) Field of Classification Search
CPC .... H04L 9/0631; H04L 2209/12; H04L 9/003; G09C 1/00
USPC .......................................................... 380/28
See application file for complete search history.

(56) References Cited

U.S. PATENT DOCUMENTS

| | | | |
|---|---|---|---|
| 7,512,241 B2* | 3/2009 | Vaudenay et al. | 380/277 |
| 2007/0244951 A1* | 10/2007 | Gressel et al. | 708/252 |
| 2008/0240426 A1* | 10/2008 | Gueron et al. | 380/44 |
| 2009/0243028 A1* | 10/2009 | Dong et al. | 257/499 |
| 2010/0232602 A1* | 9/2010 | Nobukata | 380/28 |
| 2012/0288085 A1* | 11/2012 | Li et al. | 380/28 |

* cited by examiner

*Primary Examiner* — Kambiz Zand
*Assistant Examiner* — Aubrey Wyszynski
(74) *Attorney, Agent, or Firm* — Joseph A Mancini

(57) ABSTRACT

Apparatus and method for obscuring round 1 power consumption of hardware implementation of the Advanced Encryption Standard (AES) algorithm. Additional hardware circuitry will provide consistent power consumption during round 1 of the AES algorithm. This prevents the opportunity to determine the AES key value during a side channel power attack.

3 Claims, 6 Drawing Sheets

APPARATUS AND METHOD TO PREVENT SIDE CHANNEL POWER ATTACKS IN ADVANCED ENCRYPTION STANDARD

PRIORITY CLAIM UNDER 35 U.S.C. §119(e)

This patent application claims the priority benefit of the filing date of provisional application Ser. No. 61/817,372, having been filed in the U.S. Patent and Trademark Office on Apr. 30, 2013 and now incorporated by reference herein.

STATEMENT OF GOVERNMENT INTEREST

The invention described herein may be manufactured and used by or for the Government for governmental purposes without the payment of any royalty thereon.

BACKGROUND OF THE INVENTION

This invention relates to the Advanced Encryption Standard (AES) outlined in the Federal Information Processing Standards (FIPS) Publication 197. The AES standard defines the FIPS-approved algorithm that is used to encrypt and decrypt 128 bits of data using a 128, 192, or 256 bit key. When data is encrypted (enciphered) the output data is called ciphertext and when data is decrypted (deciphered) the output data is called plaintext.

Referring to FIG. 1, the AES algorithm executes a number of rounds that are dependent on the key size. For 128 bit key 11 rounds are executed, for 192 bit key 13 rounds are executed, and for a 256 bit key 15 rounds are executed. The AES algorithm for encryption consists of four transformations: 100 AddRoundKey; 101 SubBytes; 102 ShiftRows; and 103 MixColumns.

Referring to FIG. 2, the AES algorithm for decryption consists of four transformations: 100 AddRoundKey; 201 InvShiftRows; 202 InvSubBytes; 203 InvMixColumns. The AES algorithm also defines a method of key expansion that creates a round key for each round execution of the algorithm. These round keys are utilized in the 100 AddRoundKey transformation.

Referring to FIG. 3, the 100 AddRoundKey transformation is specified as a simple bitwise exclusive or operation executed on the plaintext (encryption)/ciphertext (decryption) and round key. Each data bit 300 and each round key bit 301 are combined in exclusive OR operation 302 and stored in flip flop 303, for all 128 data bits. Round 1 of the AES algorithm only executes the AddRoundKey transformation, while all remaining rounds execute multiple transformations. This leaves round 1 vulnerable to side channel power attacks.

OBJECTS AND SUMMARY OF THE INVENTION

An object of the present invention is to provide an apparatus and method to prevent side channel power attacks from determining the key when the AES algorithm is implemented in hardware.

Another object of the present invention is to provide a method and apparatus to foreclose the opportunity to measure and detect the power consumed during round 1 of the AES encryption process.

Yet another object of the present invention is to provide a method and apparatus to prevent determination of an AES key value.

In an embodiment of the present invention, a method for obfuscating power consumption during round 1 of an Advanced Encryption Standard encryption process where the standard has a data bit and a key bit for each bit of an encryption key, each data bit is exclusive OR'd with an inverted version of each key bit. The output of the exclusive OR is then latched and the latched output is capacitively stored, thereby obfuscating the power consumption of the encryption process.

Another embodiment of the present invention, provides an apparatus for preventing the determination of an encryption key in the Advanced Encryption Standard (AES) having a data bit and a key bit for each bit of an encryption key having an exclusive OR circuit having a first input, a second input, and an exclusive OR output; a flip flop circuit having a signal input, a clock input, and a latched output; and a capacitor having a first terminal and a second terminal; where an inverted version of the key bit connected to the first input; the data bit is connected to said second input; the exclusive OR output is connected to the signal input; the latched output is connected to the first terminal of said capacitor; and the second terminal of said capacitor is connected to ground.

Yet another embodiment of the present invention provides an apparatus for securing the implementing of each bit of the Advanced Encryption Standard having a data bit and a key bit for each said bit and having first latch having a data input, a data output, and a clock input; a second latch having a data input, a data output, an inverting data output, and a clock input; a first exclusive OR gate having a first input, a second input, and an output; a second exclusive OR gate having a first input, a second input, and an output; a third latch having a data input, a data output, and a clock input; a third latch having a data input, a data output, and a clock input; a fourth latch having a data input, a data output, and a clock input; and a capacitor having a first terminal and a second terminal where the data bit is input into said data input of said first latch; the key bit is input into the data input of the second latch; the data output of the first latch is input into the first input of the first exclusive OR gate; the data output of the second latch is connected to the second input of the exclusive OR gate and to the first input of the second exclusive OR gate; the inverted data output of the second latch is connected to the second input of the second exclusive OR gate; the output of the first exclusive OR gate is connected to the data input of said fourth latch; the output of the second exclusive OR gate is connected to the data input of the third latch; the data output of the third latch is connected to the first terminal of said capacitor; the second terminal of the capacitor is connected to ground; and an output bit connection is connected to the data output of the fourth latch.

Briefly stated, the present invention provides an apparatus and method for obscuring round 1 power consumption of hardware implementation of the Advanced Encryption Standard (ABS) algorithm. Additional hardware circuitry will provide consistent power consumption during round 1 of the AES algorithm. This prevents the opportunity to determine the AES key value during a side channel power attack.

DETAILED DESCRIPTION OF THE PREFERRED EMBODIMENT

Figure 1:
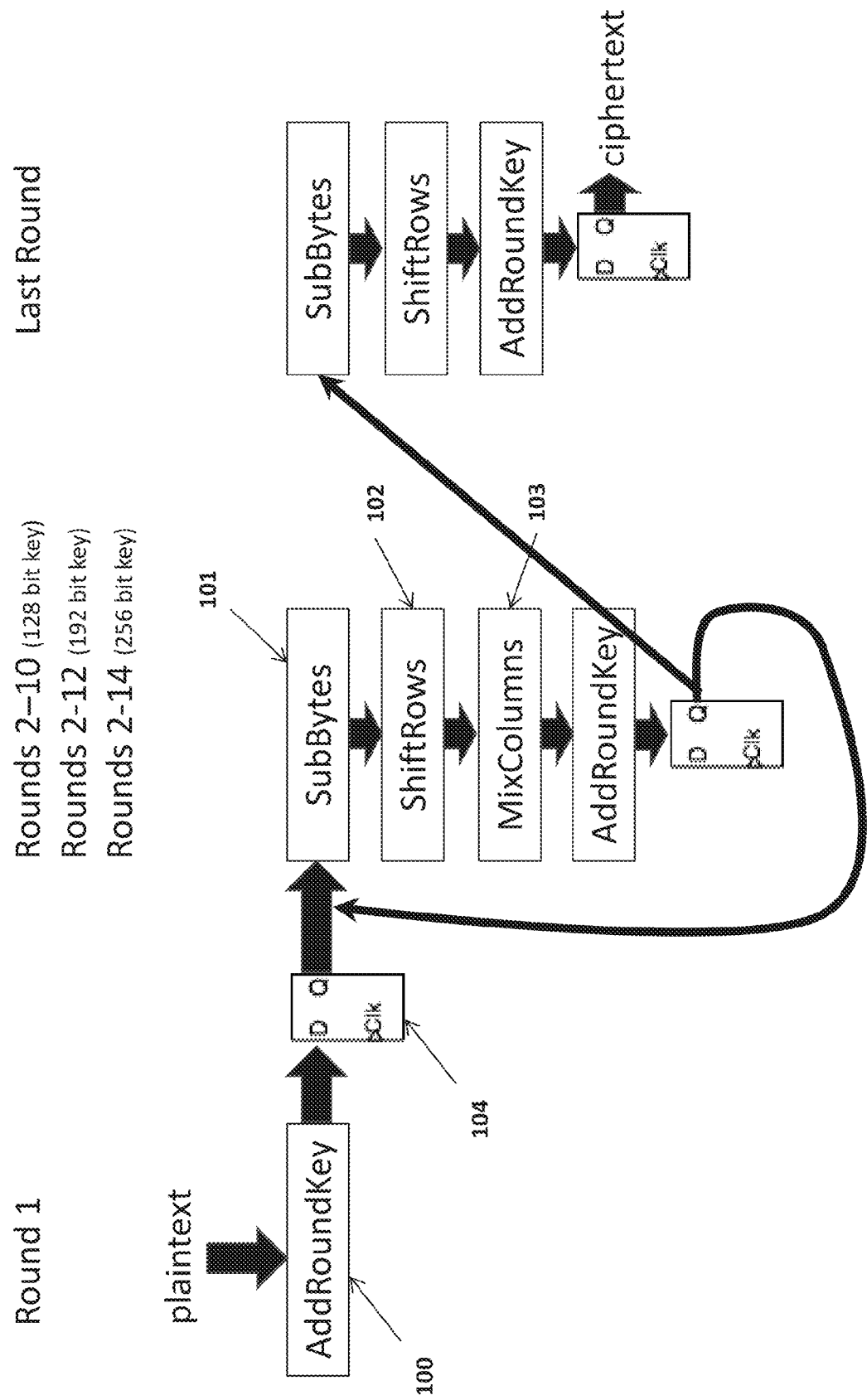
FIG. 1 is a functional diagram of the AES encryption algorithm.
Figure 2:
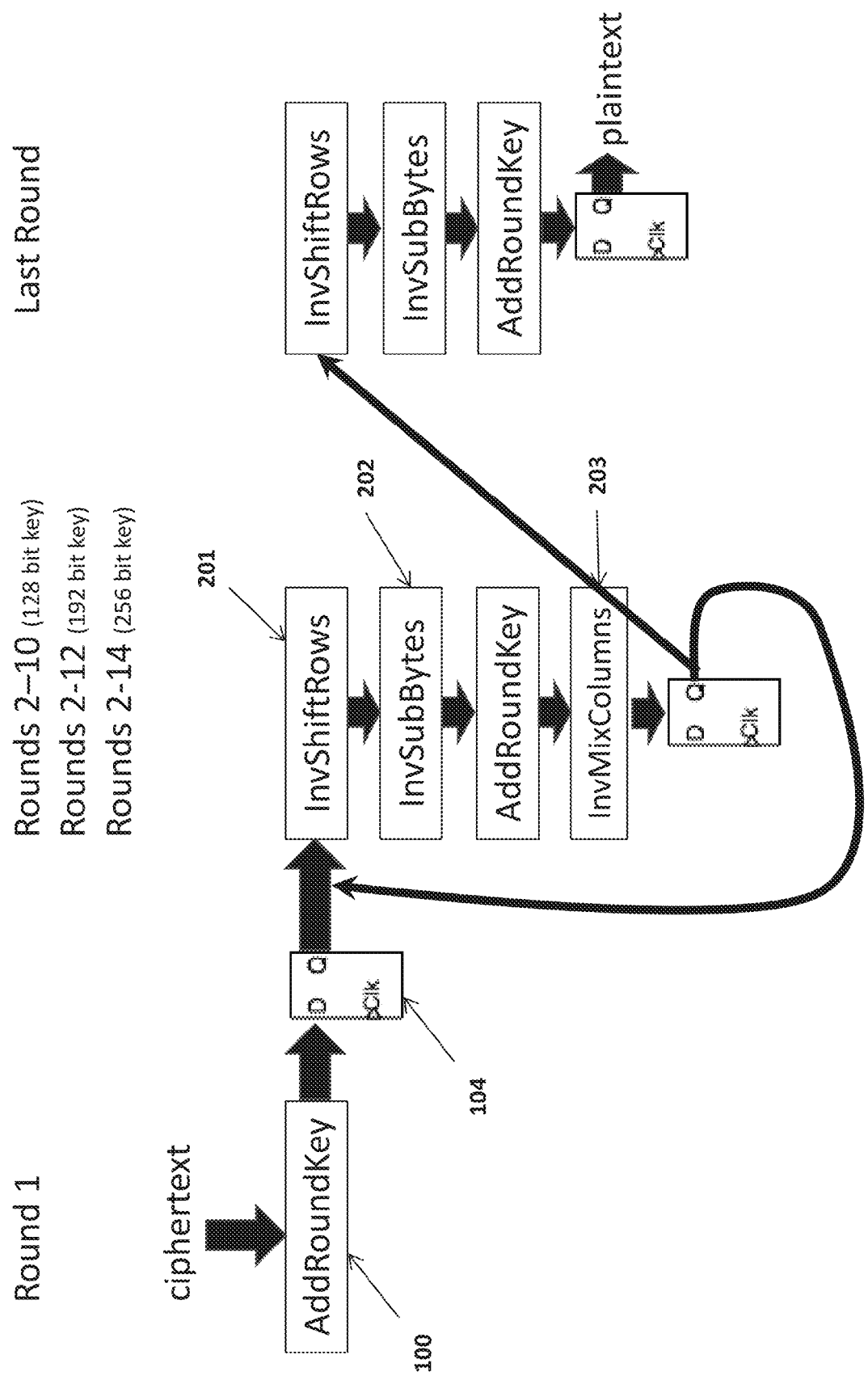
FIG. 2 is a functional diagram of the AES decryption algorithm.
Figure 3:
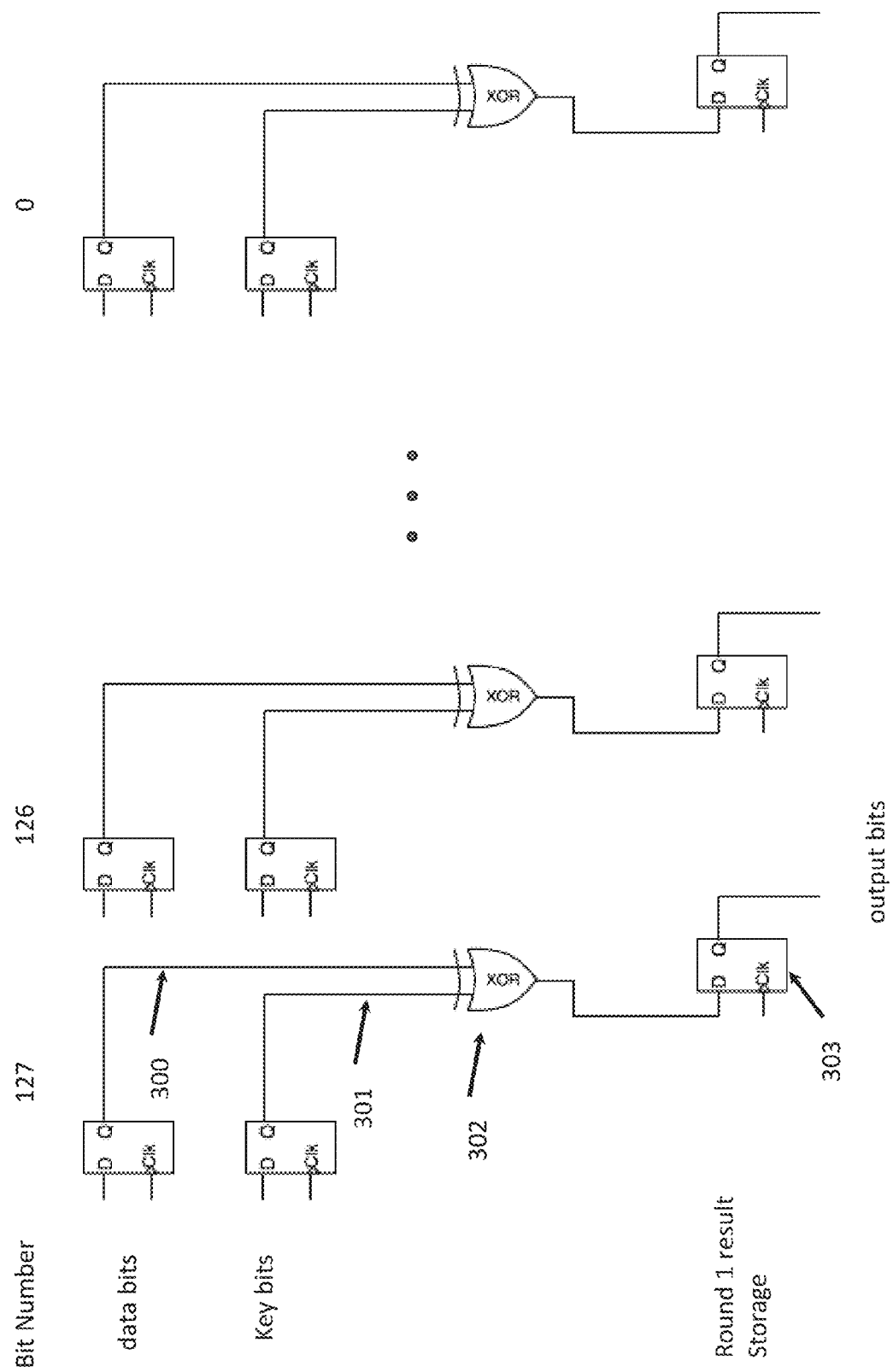
FIG. 3 is a schematic representation of the AddRoundKey transformation of the AES algorithm.

Referring to FIG. 1, round 1 as specified by the algorithm leaves the key vulnerable to side channel power attacks when the algorithm is implemented in hardware. Round 1 only executes the AddRoundKey transformation, see FIG. 3, or an exclusive OR operation of the key and data. In order to obfuscate the power consumption during round 1 execution, the present invention provides additional hardware as specified for the AddRoundKey transformation shown in FIG. 4.

Figure 4:
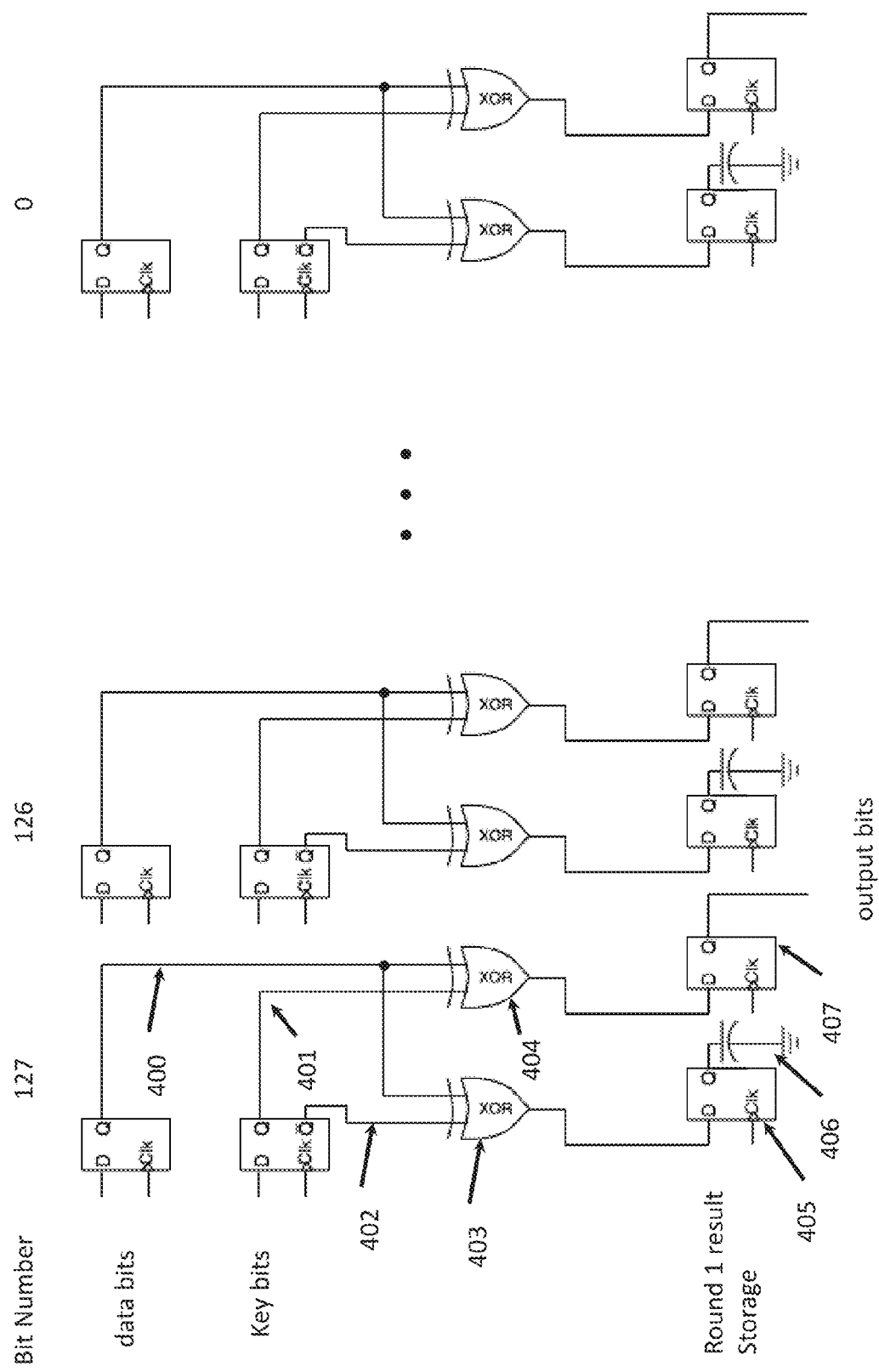
FIG. 4 is a schematic representation of the AddRoundKey transformation with the additional hardware implemented to obfuscate round 1 power consumption.

Referring to FIG. 4, the new hardware implementation is shown. A single data bit 400 and a single key bit 401 are combined in exclusive OR 404 and stored in flip flop 407. This is the necessary output of the AddRoundKey transformation for data bits. Simultaneously, data bit 400 and inverted key bit 402 are combined in exclusive OR 403 and stored in flip flop 405. The output of this flip flop is tied to capacitor 406 to provide consistent power consumption.

Figure 5:
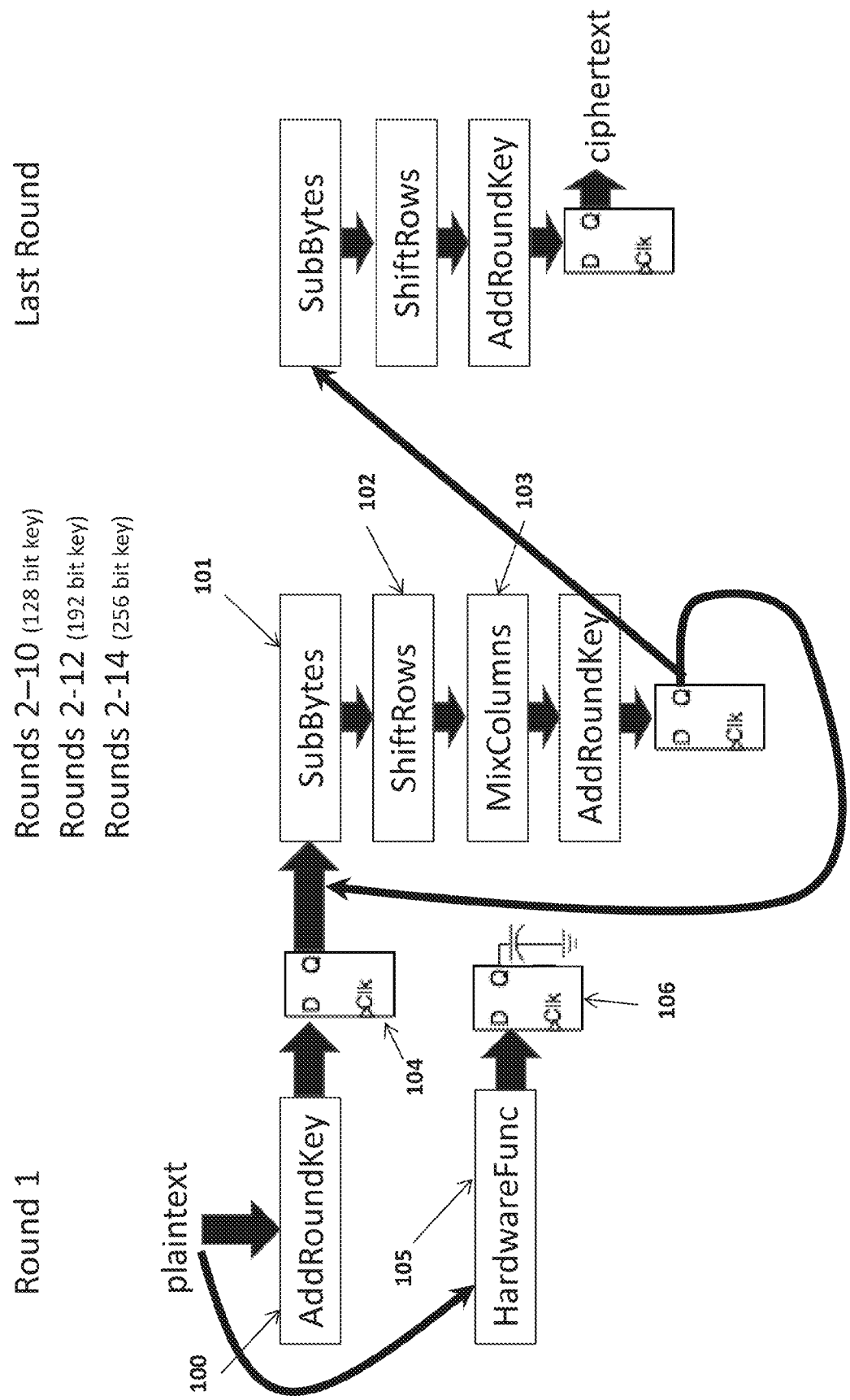
FIG. 5 is a functional diagram of the invention included in the AES encryption algorithm.

Referring to FIG. 5 depicts a functional diagram of the AES encryption algorithm with the present invention incorporated and shown as additional hardware 105.

Figure 6:
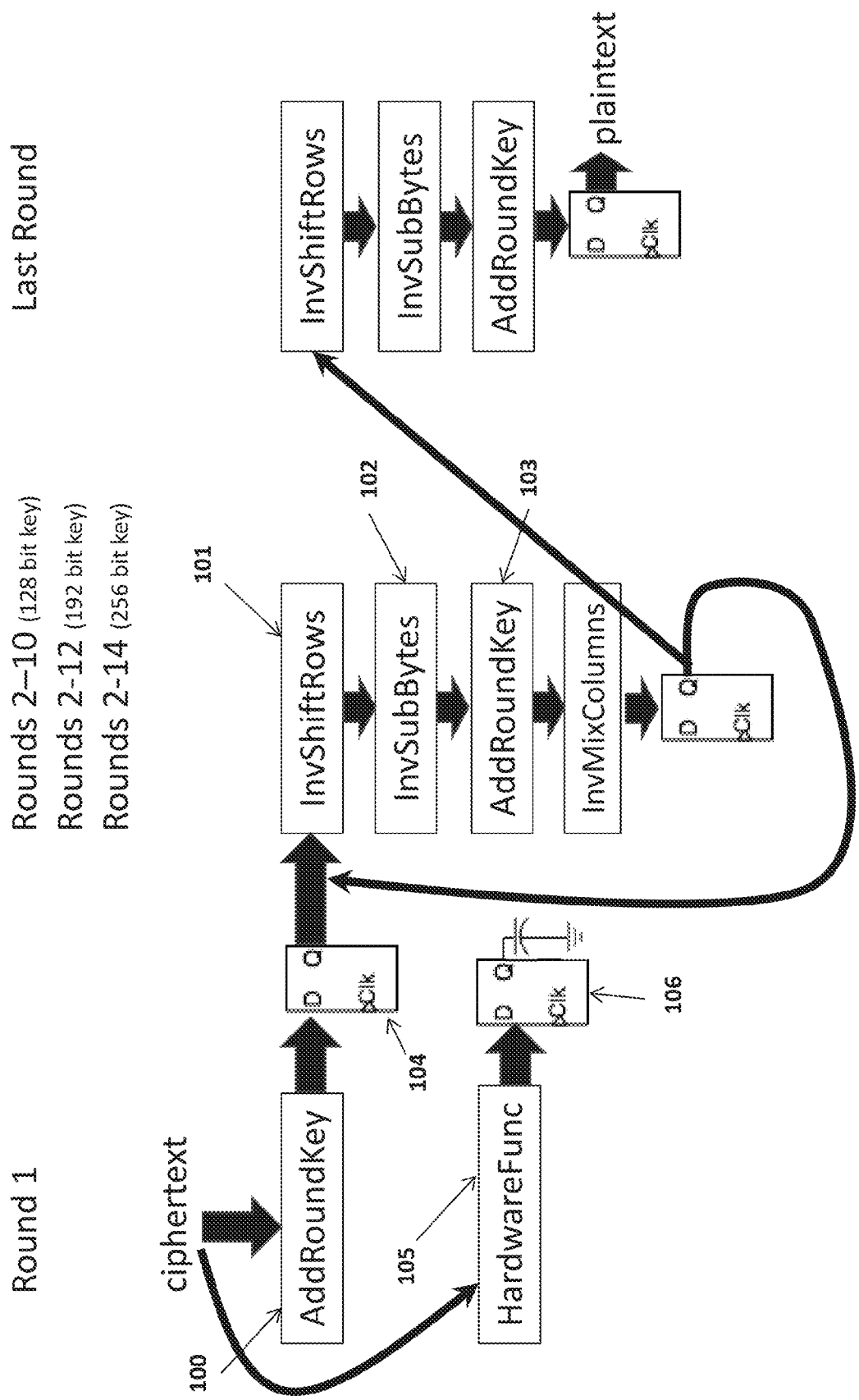
FIG. 6 is a functional diagram of the invention included in the AES decryption algorithm.

Referring to FIG. 6 depicts a functional diagram of the AES decryption algorithm with the present invention incorporated and shown as additional hardware 105.

What is claimed is:

1. In a hardware implementation of the Advanced Encryption Standard having a data bit and a key bit for each bit of an encryption key, an apparatus for preventing the determination of said encryption key, comprising:
   an exclusive OR circuit having a first input, a second input, and an exclusive OR output;
   a flip flop circuit having a signal input, a clock input, and a latched output; and
   a capacitor having a first terminal and a second terminal; wherein
      an inverted version of said key bit connected to said first input;
      said data bit is connected to said second input;
      said exclusive OR output is connected to said signal input;
      said latched output is connected to said first terminal of said capacitor; and
      said second terminal of said capacitor is connected to ground.

2. A method for obfuscating power consumption during round 1 of an Advanced Encryption Standard encryption process, said standard having a data bit and a key bit for each bit of an encryption key, comprising the steps of:
   exclusive OR'ing said data bit with an inverted version of said key bit;
   latching said output of said exclusive OR'ing step; and
   capacitively storing said latched output.

3. An apparatus for securing the implementing of each bit of the Advanced Encryption Standard, said standard having a data bit and a key bit for each said bit of said standard, said apparatus comprising for each said data bit and said key bit:
   a first latch having a data input, a data output, and a clock input;
   a second latch having a data input, a data output, an inverting data output, and a clock input;
   a first exclusive OR gate having a first input, a second input, and all output;
   a second exclusive OR gate having a first input, a second input, and an output;
   a third latch having a data input, a data output, and a clock input;
   a fourth latch having a data input, a data output, and a clock input; and
   a capacitor having a first terminal and a second terminal; wherein
      said data bit is input into said data input of said first latch;
      said key bit is input into said data input of said second latch;
      said data output of said first latch is input into said first input of said first exclusive OR gate and said first input of said second exclusive OR gate;
      said data output of said second latch is connected to said second input of said first exclusive OR gate;
      said inverted data output of said second latch is connected to said second input of said second exclusive OR gate;
      said output of said first exclusive OR gate is connected to said data input of said fourth latch;
      said output of said second exclusive OR gate is connected to said data input of said third latch;
      said data output of said third latch is connected to said first terminal of said capacitor;
      said second terminal of said capacitor is connected to ground; and
      an output bit connection is connected to said data output of said fourth latch.

* * * * *